United States Patent
Asami et al.

(10) Patent No.: US 11,124,434 B2
(45) Date of Patent: Sep. 21, 2021

(54) IN-LIQUID PLASMA DEVICE

(71) Applicant: NIHON SPINDLE MANUFACTURING CO., LTD., Hyogo (JP)

(72) Inventors: Keiichi Asami, Hyogo (JP); Keiichiro Onishi, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 186 days.

(21) Appl. No.: 16/503,075

(22) Filed: Jul. 3, 2019

(65) Prior Publication Data

US 2019/0322551 A1    Oct. 24, 2019

Related U.S. Application Data

(63) Continuation of application No. PCT/JP2018/003831, filed on Feb. 5, 2018.

(30) Foreign Application Priority Data

Feb. 3, 2017   (JP) .............................. JP2017-018578

(51) Int. Cl.
   *C02F 1/46*   (2006.01)
   *C02F 1/34*   (2006.01)
   (Continued)

(52) U.S. Cl.
   CPC .............. *C02F 1/4608* (2013.01); *C02F 1/34* (2013.01); *F04D 7/02* (2013.01); *H05H 1/24* (2013.01); *C02F 2303/04* (2013.01)

(58) Field of Classification Search
   CPC .... C02F 1/4608; C02F 1/34; C02F 2301/046; C02F 2303/04; B01J 19/008; B01J 19/0088; B01J 2219/0894; B01J 2219/0896
   See application file for complete search history.

(56) References Cited

U.S. PATENT DOCUMENTS 4,906,387 A * 3/1990 Pisani ...................... C02F 1/32
                                                  210/748.12
5,810,052 A * 9/1998 Kozyuk ................ B01F 3/0811
                                                      138/37
(Continued)

FOREIGN PATENT DOCUMENTS

CN         203558900         4/2014
CN         105461006 A       4/2016
(Continued)

OTHER PUBLICATIONS

Machine Translation of CN105461006 (Year: 2016).*
(Continued)

*Primary Examiner* — Lessanework Seifu
(74) *Attorney, Agent, or Firm* — Michael Best & Friedrich LLP

(57) ABSTRACT

There is provided an in-liquid plasma device including a tubular flow channel in which a liquid flow, and a cavitation generator and a voltage application unit which are disposed in the tubular flow channel. The cavitation generator generates cavitation in the liquid inside the tubular flow channel. The voltage application unit is located in the tubular flow channel so as to generate plasma by applying a voltage to the liquid in which the cavitation is generated. The cavitation generator has a throttle portion whose inner diameter is smaller than other sites in the tubular flow channel. The throttle portion has an upstream side inclined surface located on an upstream side of a narrowest site of the throttle portion, and a downstream side inclined surface located on a downstream side of the narrowest site of the throttle portion.

8 Claims, 9 Drawing Sheets

(51) Int. Cl.
*F04D 7/02* (2006.01)
*H05H 1/24* (2006.01)

(56) References Cited

U.S. PATENT DOCUMENTS

| | | | |
|---|---|---|---|
| 7,704,401 B2 | 4/2010 | Ike et al. | |
| 9,023,214 B2* | 5/2015 | Zolezzi-Garreton | ..... C02F 1/78 |
| | | | 210/748.17 |
| 2009/0071910 A1 | 3/2009 | Ike et al. | |
| 2011/0240567 A1 | 10/2011 | Zolezzi-Garreton | |
| 2015/0139853 A1 | 5/2015 | Zolezzi-Garreton | |

FOREIGN PATENT DOCUMENTS

| | | |
|---|---|---|
| CN | 105541060 A | 5/2016 |
| EP | 3 321 233 A1 | 5/2018 |
| JP | S61-136484 A | 6/1986 |
| JP | 2000-093967 A | 4/2000 |
| JP | 2006-021086 A | 1/2006 |
| JP | 2010-022991 A | 2/2010 |
| JP | 4453052 B2 | 4/2010 |
| JP | 2011-041914 A | 3/2011 |
| JP | 4813443 B2 | 11/2011 |
| JP | 2013-519503 A | 5/2013 |
| JP | 5464692 B2 | 4/2014 |
| JP | 2015-003297 A | 1/2015 |
| WO | WO-2007/138773 A1 | 12/2007 |
| WO | WO-2011/021515 A1 | 2/2011 |
| WO | WO-2011/098918 A2 | 8/2011 |
| WO | WO-2015/077062 A1 | 5/2015 |

OTHER PUBLICATIONS

International Search Report issued in Application No. PCT/JP2018/003831, dated May 15, 2018.
Search Report issued in European Application No. 18747740.1, dated Jan. 7, 2020.

* cited by examiner

IN-LIQUID PLASMA DEVICE

RELATED APPLICATIONS

The contents of Japanese Patent Application No. 2017-018578, and of International Patent Application No. PCT/JP2018/003831, on the basis of each of which priority benefits are claimed in an accompanying application data sheet, are in their entirety incorporated herein by reference.

BACKGROUND

Technical Field

Certain embodiments of the present invention relate to an in-liquid plasma device which generates plasma in a liquid.

Description of Related Art

A device is known which generates plasma in a liquid so as performing electrochemical treatment. According to a device disclosed in the related art, a treatment tank of a rectangular box-shaped container is filled with a treatment target liquid. A conductive plate, a convex plate-shaped body, a projecting plate, and an electrode are arranged inside the treatment tank. If a high voltage is applied among the plate-shaped body, the projecting plate, and the electrode, the plasma is generated, and the treatment target liquid is electrochemically subjected to purifying and sterilizing treatment.

According to another device disclosed in the related art, in order to lower a voltage for generating the plasma, gas is injected into the treatment from a tubular electrode tank so as to form bubbles. In this manner, the gas and the treatment target liquid are in a state of being interposed between the electrodes. In this manner, a high voltage pulse applied between the electrodes generates the plasma even at a low voltage, and the treatment target liquid is electrochemically treated.

According to other devices disclosed in the related art, a nozzle having a reduced inner diameter of a water flow pipe is disposed on a post stage of a pressurizing unit for pressurizing and feeding treatment target water. Counter electrodes are arranged in the post stage (downstream side) of the nozzle. The treatment target water is supplied at constant pressure so as to generate minute cavitation bubbles, and the high voltage is applied between the counter electrodes so as to generate discharge plasma. In this manner, a treatment target substance such as an organic substance contained in the treatment target water is subjected to decomposition or composition.

SUMMARY

According to an embodiment of the present invention, there is provided an in-liquid plasma device including a tubular flow channel in which a liquid flows, and a cavitation generator and a voltage application unit which are disposed in the tubular flow channel. The cavitation generator generates cavitation in the liquid inside the tubular flow channel. The voltage application unit is located in the tubular flow channel so as to generate plasma by applying a voltage to the liquid in which the cavitation is generated.

The cavitation generator is configured to have a throttle portion whose inner diameter is smaller than other sites in the tubular flow channel. The throttle portion is configured to have an upstream side inclined surface which is an inclined surface located on an upstream side of a narrowest site of the throttle portion, and a downstream side inclined surface which is an inclined surface located on a downstream side of the narrowest site of the throttle portion.

DETAILED DESCRIPTION

The respective devices disclosed in the related art are so-called batch-type devices which perform treatment by filling the treatment tank with the treatment target liquid. Accordingly, it is difficult to increase treatment efficiency (throughput per hour). In addition, the device disclosed in PTL 2 requires a device for injecting the gas, thereby causing a problem of a complicated device configuration.

Figure 6:
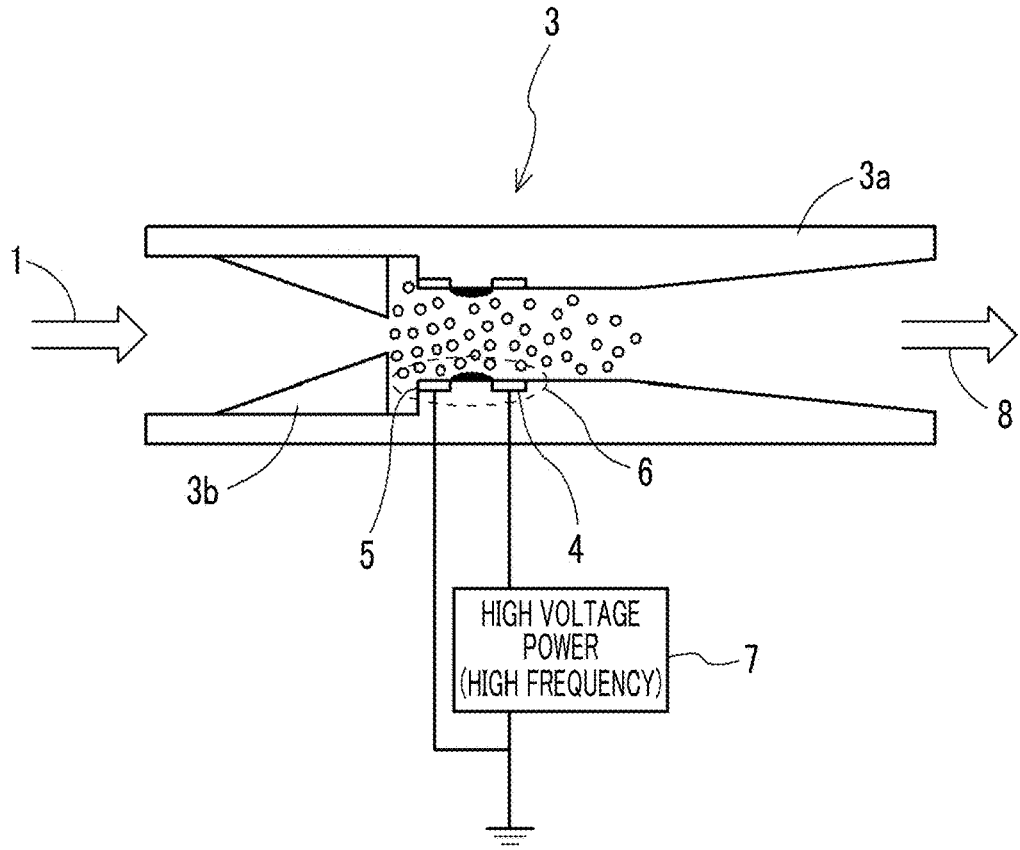
FIG. 6 is a schematic view illustrating a structure of a device in the related art.

According to the respective devices disclosed in the related art, as illustrated in FIG. 6, an end portion on a downstream side of a nozzle (3b) is formed as a plane perpendicular to a flowing direction of the treatment target water. Therefore, a diameter of a flow channel of the treatment target water is discontinuously changed on the downstream side of the nozzle, and is rapidly enlarged. In the flow channel having this shape, a turbulent flow or a separated flow is generated in the vicinity or on the downstream side of the nozzle. In this case, the cavitation bubbles are unlikely to be generated, and the bubbles are less likely to be uniform. Accordingly, it is necessary to considerably increase flow velocity of the treatment target water, and the plasma is unlikely to be generated. Consequently, efficiency becomes poor in performing the treatment on the treatment target water, and there is a possibility that the treatment may not be sufficiently performed on the plasma.

It is desirable to provide an in-liquid plasma device for which a device configuration is simplified while treatment efficiency is improved.

According to the above-described configuration, the plasma is generated in the liquid flowing through the tubular flow channel. Accordingly, treatment efficiency of the liquid can be significantly improved, compared to a method of using the above-described treatment tank. The cavitation generator disposed in the tubular flow channel generates the cavitation in the liquid inside the tubular flow channel. The voltage application unit is located in the tubular flow channel so as to generate the plasma by applying the voltage to the liquid in which the cavitation is generated. Therefore, while a device configuration is simplified, treatment can be performed on the liquid in such a way that gas generated through the cavitation is used to generate the plasma by applying a relatively low voltage. Without being limited to purifying and sterilizing treatment of the liquid, the above-described in-liquid plasma device can be used for various applications such as promotion of powder dispersion to the liquid. In addition, the above-described in-liquid plasma device can also be used in composing metal nanoparticles of gold, platinum, and copper.

The cavitation generator is configured to have the throttle portion whose inner diameter is smaller than other sites in the tubular flow channel with. The throttle portion is configured to the upstream side inclined surface which is the inclined surface located on the upstream side of the narrowest site of the throttle portion and the downstream side inclined surface which is located on the downstream side of the narrowest site of the throttle portion. Accordingly, the inner diameter of the throttle portion continuously increases and decreases from the upstream side to the downstream side of the narrowest site. Therefore, the occurrence of a turbulent flow or a separated flow is prevented from being generated. Cavitation bubbles are likely to be generated, and the generated bubbles are likely to be uniform. That is, according to the above-described configuration, uniform cavitation bubbles can be generated at a lower flow rate (flow velocity), and plasma treatment can be more properly performed on the liquid.

In the in-liquid plasma device according to another aspect of the present invention, a shape of the downstream side inclined surface may be expressed by a sine function.

According to the above-described configuration, the liquid more smoothly flows in the throttle portion. The turbulent flow or the separated flow is preferably prevented from being generated.

In the in-liquid plasma device according to another aspect of the present invention, the upstream side inclined surface and the downstream side inclined surface may have a symmetrical shape with respect to the narrowest site.

According to the above-described configuration, the liquid more smoothly flows in the throttle portion. The turbulent flow or the separated flow is preferably prevented from being generated.

In the in-liquid plasma device according to another aspect of the present invention, the downstream side inclined surface may have such a shape that a flow of the liquid is not separated.

If the separated flow is generated in the throttle portion, pressure of the liquid is prevented from being lowered, and the cavitation is less likely to be generated. According to the above-described configuration, the cavitation is likely to be generated in the throttle portion, and the plasma treatment can be more properly performed on the liquid.

In the in-liquid plasma device according to another aspect of the present invention, the cavitation generator may have at least two throttle portions adjacent to each other in series, and the voltage applied to the liquid by the voltage application unit in an upstream throttle portion located on an upstream side may be higher than the voltage applied to the liquid by the voltage application unit in a downstream throttle portion located on a downstream side of the upstream throttle portion.

According to the above-described configuration, the voltage applied to the upstream throttle portion is higher than the voltage applied to the downstream throttle portion. Accordingly, the efficient plasma treatment can be preferably performed by generating a larger amount of the plasma on the upstream side.

In the in-liquid plasma device according to another aspect of the present invention, the cavitation generator may have at least two throttle portions adjacent to each other in series, and the inner diameter of an upstream throttle portion located on an upstream side may be larger than the inner diameter of a downstream throttle portion located on a downstream side of the upstream throttle portion.

According to the above-described configuration, the inner diameter of the upstream throttle portion is larger than the inner diameter of the downstream throttle portion. Accordingly, the efficient plasma treatment can be preferably performed by generating a larger amount of the bubbles on the downstream side.

In the in-liquid plasma device according to another aspect of the present invention, a plurality of the tubular flow channel may be arranged in parallel.

According to the above-described configuration, the plurality of tubular flow channels are arranged in parallel. Accordingly, treatment efficiency (throughput per hour) of the in-liquid plasma device can be preferably further improved.

The embodiments of the present invention are preferably applicable to the in-liquid plasma device having a centrifugal type suction pump, in which the liquid flowing out of the tubular flow channel is supplied to the suction pump and the liquid discharged from the suction pump is supplied to the tubular flow channel.

Figure 1:
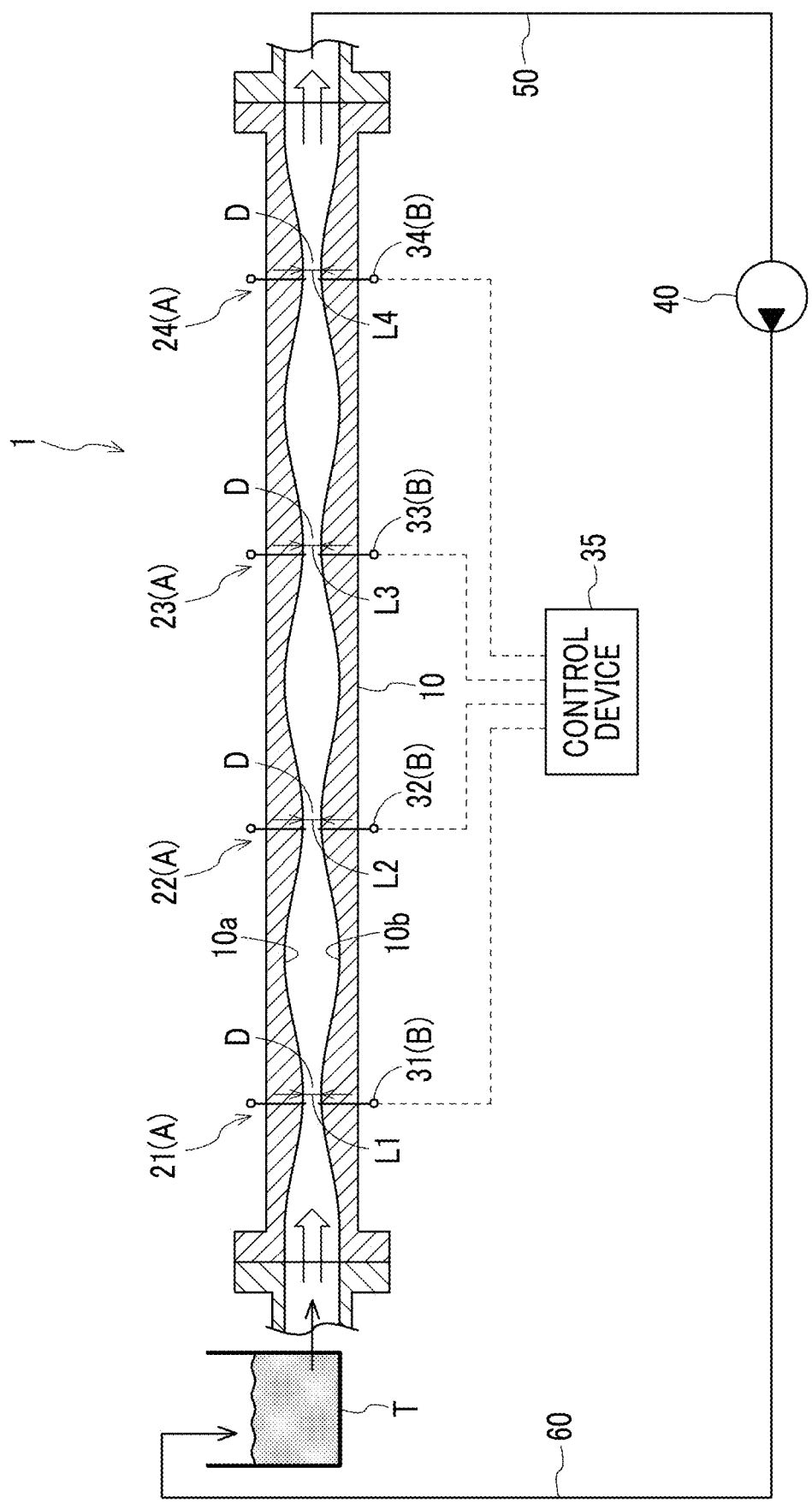
FIG. 1 is a schematic view illustrating a configuration of an in-liquid plasma device.

Hereinafter, an in-liquid plasma device according to the present embodiment will be described with reference to the drawings. As illustrated in FIG. 1, an in-liquid plasma device 1 is configured to have a tubular flow channel 10, a cavitation generator A, a voltage application unit B, a suction pump 40, a tubular portion 50, a tubular portion 60, and a tank T.

An outlet of the tubular flow channel 10 and an inlet of the suction pump 40 are connected to each other by the tubular portion 50. The tubular portion 60 is connected to the outlet of the suction pump 40. The outlet of the tubular portion 60 is located above the tank T. The tank T and the tubular flow channel 10 are connected to each other. According to the above-described configuration, a liquid of the tank T is suctioned into the suction pump 40, and flows through the tubular flow channel 10. After passing through the tubular portion 50, the suction pump 40, and the tubular portion 60, the liquid returns to the tank T. That is, a circulation flow channel through which the liquid is circulated in the tank T and the tubular flow channel 10 is formed.

The cavitation generator A generates cavitation in the liquid inside the tubular flow channel 10. The voltage application unit B is located in the tubular flow channel 10 so as to generate plasma by applying a voltage to the liquid in which the cavitation is generated.

According to the in-liquid plasma device 1 configured as described above, plasma treatment can be performed on the liquid flowing through the tubular flow channel 10. For example, the liquid can be subjected to purifying and sterilizing treatment. For example, the liquid can be used as a mixed fluid between a dispersoid and a liquid phase dispersion medium so as to assist dispersion of the dispersoid into the liquid phase dispersion medium. Even if the dispersoid is less likely to be dispersed, an OH group or an H group is generated on a surface through plasma treatment, and the dispersion is assisted by this surface modification. More specifically, the present embodiment is applicable to the dispersion of a material of a lithium ion battery and a carbon material into a resin reinforcing material, particularly, modification of a material which is less likely to be dispersed such as carbon nanotube and carbon black, highly concentrated dispersion of an inorganic material such as titanium oxide in cosmetics.

The tubular flow channel 10 is a tubular member, and is configured to have a first throttle portion 21, a second throttle portion 22, a third throttle portion 23, and a fourth throttle portion 24. According to the present embodiment, across section of the tubular flow channel 10 is formed in a rectangular shape. Specifically, the tubular flow channel 10 is configured to have an upper wall surface 10a, a lower wall surface 10b, and a pair of side wall surfaces 10c and 10d (refer to FIG. 2). A distance between the pair of side wall surfaces is constant. As illustrated in FIG. 1, the upper wall surface 10a and the lower wall surface 10b are formed in a corrugated shape whose height is continuously changed. That is, the rectangular shape of the cross section of the tubular flow channel 10 has a constant size in a width direction (direction perpendicular to a paper surface of FIG. 1). A size in a height direction (direction perpendicular to a flowing direction of the liquid and directed from the lower wall surface 10b to the upper wall surface 10a) is continuously and periodically changed.

More specifically, the upper wall surface 10a and the lower wall surface 10b are formed in a sine wave shape. A top of a valley of the upper wall surface 10a and a top of a mountain of the lower wall surface 10b are arranged at a position where both of these coincide with each other in the flowing direction of the liquid. In this manner, the tubular flow channel 10 has a throttle portion whose inner diameter is smaller than other sites. According to the present embodiment, four throttle portions including a first throttle portion 21, a second throttle portion 22, a third throttle portion 23, and a fourth throttle portion are formed along the flowing direction of the liquid.

If the liquid flows in the tubular flow channel 10 configured in this way, a cross-sectional area (that is, an area having a rectangular cross section) of the tubular flow channel 10 is periodically changed, thereby increasing flow velocity in a site having a small cross-sectional area and lowering pressure of the liquid. According to the present embodiment, the pressure of the liquid is lowered in the four throttle portions of the tubular flow channel 10. If the lowered pressure of the liquid falls below saturated vapor pressure of the liquid, the liquid is subjected to decompression boiling, and the cavitation is generated in the liquid. That is, according to the present embodiment, the cavitation generator A is configured to have the four throttle portions (the first throttle portion 21, the second throttle portion 22, the third throttle portion 23, and the fourth throttle portion 24).

According to the present embodiment, an inner diameter L1 of the first throttle portion 21, an inner diameter L2 of the second throttle portion 22, an inner diameter L3 of the third throttle portion 23, and an inner diameter L4 of the fourth throttle portion 24 satisfy the following relationship.

$$L1>L2>L3>L4$$

That is, the plurality of throat portions in the tubular flow channel 10 are formed so that each inner diameter thereof gradually decreases along the flowing direction of the liquid. In other words, the inner diameter (L1) of an upstream throttle portion (for example, the first throttle portion 21) located on an upstream side is larger than the inner diameter (L2) of a downstream throttle portion (for example, the second throttle portion) located on a downstream side of the upstream throttle portion. 22).

According to the present embodiment, the voltage application unit B is configured to have a first electrode unit 31, a second electrode unit 32, a third electrode unit 33, and a fourth electrode unit 34. The four electrode units are respectively configured to include a pair of electrodes located on the upper wall surface 10a and the lower wall surface 10b of the tubular flow channel 10 as illustrated in FIG. 1. The four electrode units are respectively connected to a control device 35, and a high voltage is supplied thereto from the control device 35. The high voltage is applied between the electrode of the upper wall surface 10a and the electrode of the lower wall surface 10b. In this manner, the plasma is generated in the liquid flowing through the tubular flow channel 10.

The electrode of the first electrode unit 31 is located in the first throttle portion 21. The electrode of the second electrode unit 32 is located in the second throttle portion 22. The electrode of the third electrode unit 33 is located in the third throttle portion 23. The electrode of the fourth electrode unit 34 is located in the fourth throttle portion 24. Specifically, each electrode of the respective throttle portions is located on a slightly upstream side of a site where the inner diameter of the tubular flow channel 10 is smallest, that is, a site (narrowest site D) where the upper wall surface 10a and the lower wall surface 10b are closest to each other. As will be described later, according to the tubular flow channel 10 of the present embodiment, cavitation bubbles are generated not only on the downstream side but also on the upstream side of the narrowest site D in the cavitation generator A. Each electrode is located on the upstream side of the narrowest site D. In this manner, the plasma is generated using the bubbles generated on the upstream side of the narrowest site D, and the plasma treatment is more preferably performed on the liquid.

According to the present embodiment, a voltage V1 applied to the liquid by the first electrode unit 31 in the first throttle portion 21, a voltage V2 applied to the liquid by the second electrode unit 32 in the second throttle portion 22, and a voltage V3 applied to the liquid by the third electrode unit 33 in the third throttle portion 23, a voltage V4 applied to the liquid by the fourth electrode unit 34 in the fourth throttle portion 24 satisfy the following relationship.

$$V1>V2>V3>V4$$

That is, the voltage applied to the liquid inside the tubular flow channel 10 is controlled so as to gradually decrease along the flowing direction of the liquid. In other words, the voltage (V1) applied to the liquid by the voltage application unit in the upstream throttle portion (for example, the first throttle portion 21) located on the upstream side is higher than the voltage (V2) applied to the liquid in the downstream throttle portion (for example, the second throttle portion 22) located on the downstream side of the upstream throttle portion.

The suction pump 40 is a mechanism for feeding the liquid to the downstream side by suctioning the liquid from the upstream side. As the suction pump 40, any pump capable of feeding the liquid can be preferably used. Further, it is also possible to preferably use a dispersion liquid producing device in which rotary blades are rotated inside the device so as to suction powder and a fluid, and in which the powder is discharged after being internally dispersed. Specifically, the following form may be adopted. The dispersion liquid producing device is moved inside a blade chamber of the rotary blades. In this manner, the plurality of rotary blades, a stator, and a plurality of fluid spaces divided by an outer peripheral wall portion are rotationally moved. The mixed fluid is suctioned into the fluid space via a through hole from an introduction chamber. The mixed fluid is discharged to the outlet from the fluid space, when the fluid space communicates with the outlet.

Hereinafter, a shape of the tubular flow channel 10 will be described in more detail with reference to FIGS. 2 to 5.

Figure 2:
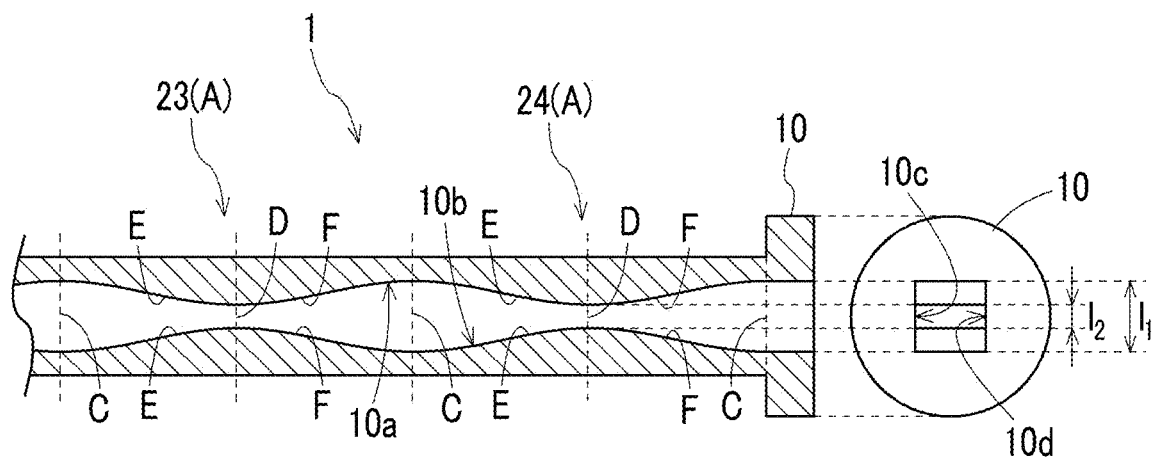
FIG. 2 is a front view and a side view illustrating a shape of a tubular flow channel.

In the tubular flow channel 10 according to the present embodiment, the respective throttle portions are configured to have an upstream side inclined surface E which is an inclined surface located on the upstream side of the narrowest site D of the throttle portion and a downstream side inclined surface F which is an inclined surface located on the downstream side of the narrowest site D of the throttle portion (FIG. 2 illustrates the third throttle portion 23 and the fourth throttle portion 24). As described above, according to the present embodiment, each shape of the upstream side inclined surface E and the downstream side inclined surface F is expressed using a sine function. In addition, the upstream side inclined surface E and the downstream side inclined surface F have a symmetrical shape with respect to the narrowest site D.

In particular, the downstream side inclined surface F of the tubular flow channel 10 is formed in a shape in which a liquid flow is not separated. The shape in which the liquid flow is not separated can be determined as follows, for example.

Figure 3:
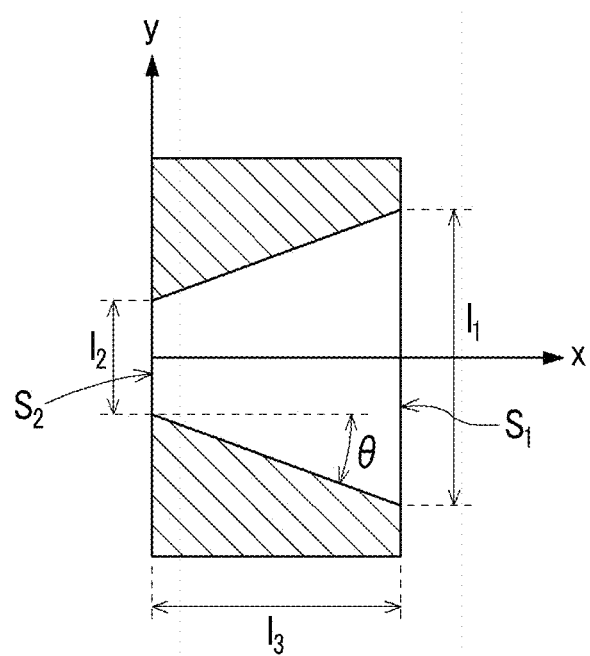
FIG. 3 is a schematic view illustrating a shape of an inner wall of a conical diffuser.
Figure 4:
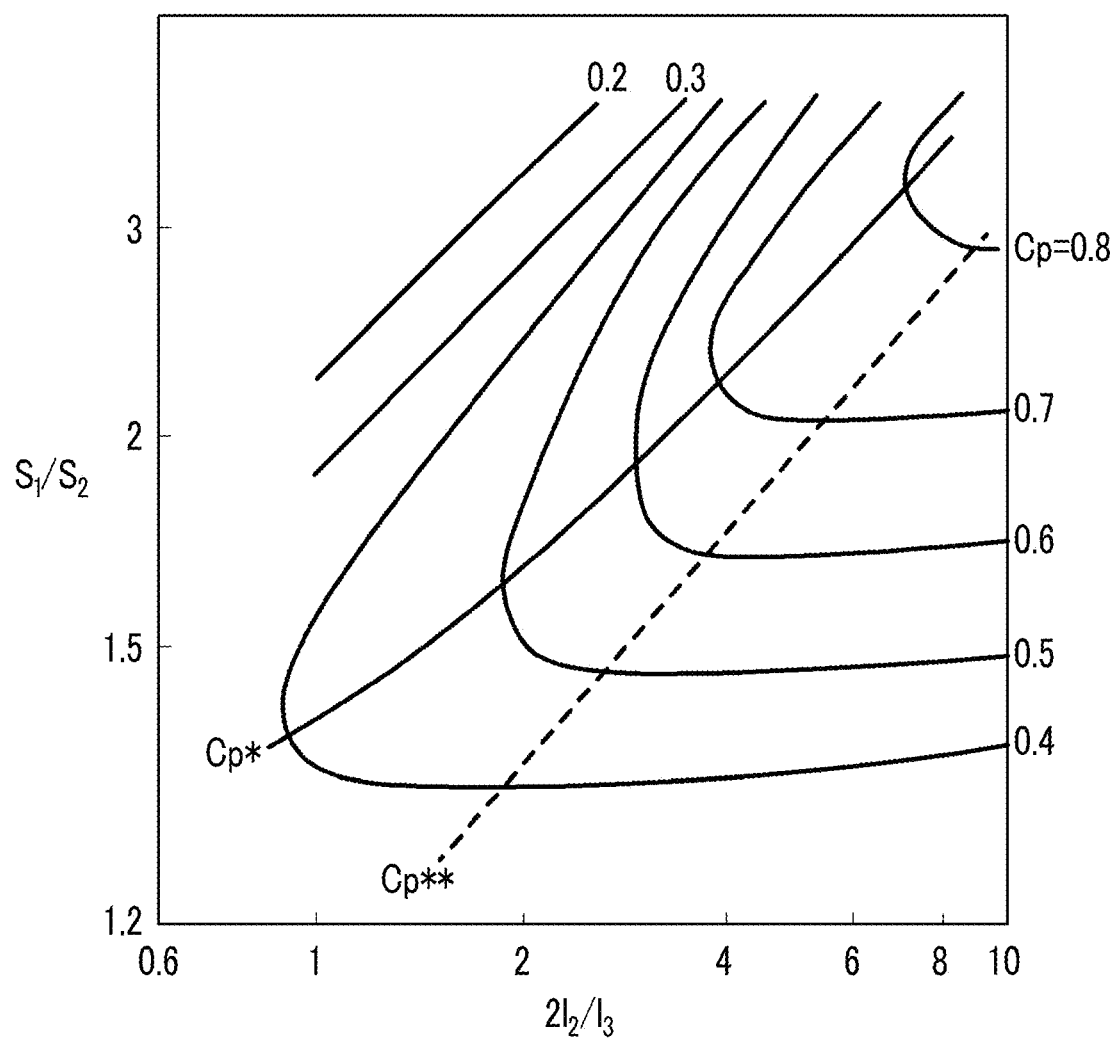
FIG. 4 is a diffuser chart of the conical diffuser.

With regard to a general conical diffuser illustrated in FIG. 3, conditions under which the liquid flow is not separated from an inner wall can be obtained using a diffuser chart illustrated in FIG. 4. In the diffuser chart illustrated in FIG. 4, in a right side region from a line Cp, the liquid flow is stabilized without being separated. That is, if a value of 2l3/l2 (hereinafter, referred to as n) and S1/S2 (area ratio of a cross-sectional area) is determined so as to be located in the right side region from the line Cp, the liquid flow is not separated. A tangent of inclination θ of a diffuser inner wall in this case can be expressed as follows with reference to FIG. 3.

$$\tan\theta = \frac{\frac{l_1 - l_2}{2}}{l_3} = \frac{\frac{S_1}{S_2}l_2 - l_2}{\frac{nl_2}{2}} = \frac{\frac{S_1}{S_2} - 1}{n} \quad \text{Expression 1}$$

If the above-described discussion is applied so that the inclination of the downstream side inclined surface F is equal to or smaller than tan θ, it is conceivable that a flow of a mixed solution MI is not separated.

Figure 5:
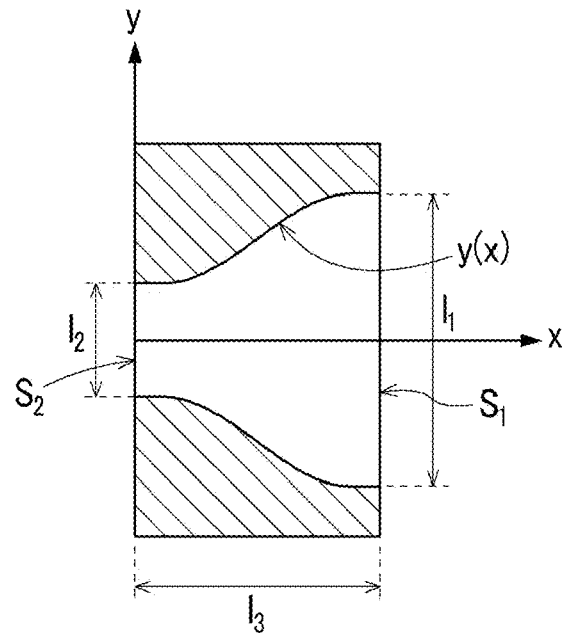
FIG. 5 is a schematic view illustrating a shape of an inner wall of the tubular flow channel.

In a shape of the downstream side inclined surface F illustrated in FIG. 5, a condition under which the inclination is equal to or smaller than tan θ of Expression 1 is obtained as follows. A function y(x) expressing the shape of the inner wall of the downstream side inclined surface F is set using constants a and b as follows.

$$y(x) = a\sin\left(bx - \frac{\pi}{2}\right) + \left(a + \frac{l_2}{2}\right) \quad \text{Expression 2}$$

Maximum inclination of this function appears at x=π/2b. Accordingly, the inclination may fall within an angle expressed by Expression 1. That is, the following relationship may be satisfied.

$$y'\left(\frac{\pi}{2b}\right) = ab \le \tan\theta = \frac{\frac{S_1}{S_2} - 1}{n} \quad \text{Expression 3}$$

The constant b is obtained from Expression 2 and Expression 3 as follows.

$$ab = \quad \text{Expression 4}$$

$$\frac{\frac{S_1}{S_2} - 1}{n} \Leftrightarrow b = \frac{\frac{S_1}{S_2} - 1}{n} \times \frac{1}{a} = \frac{\frac{S_1}{S_2} - 1}{n} \times \frac{1}{\frac{l_2\left(\frac{S_1}{S_2} - 1\right)}{4}} = \frac{4}{nl_2}$$

Therefore, the function y(x) representing the shape of the downstream side inclined surface F can be expressed as follows.

$$y(x) = \frac{l_2\left(\frac{S_1}{S_2} - 1\right)}{4}\sin\left(\frac{4}{nl_2}x - \frac{\pi}{2}\right) + \frac{l_2\left(\frac{S_1}{S_2} + 1\right)}{4} \quad \text{Expression 5}$$

As described above, the values of 2l3/l2 and S1/S2 are properly determined, and the shape of the downstream side inclined surface F is determined based on the values. In this manner, the downstream side inclined surface F can have a shape in which the flow is not separated from the inner wall.

Sterilization Confirmation

The above-described in-liquid plasma device 1 is used so as to perform tests to sterilize *E. coli* in water. Details of the in-liquid plasma device 1 serving as a test device and test conditions are described below.

Shape of Tubular Flow Channel 10
Height of Throttle Portion (L1 to L4): 5 mm
Width of Throttle Portion: 15 mm
Height of Largest Inner Diameter Portion: 15 mm
Length: 720 mm
Operating Condition of Suction Pump 40
Flow Velocity of Liquid: 800 m/min or faster
Operating Condition of Voltage Application Unit B
Application Voltage: ±4.0 kV
Pulse Width: 1.5 μs
Pulse Frequency: 60 kHz When 0.01 ml of a test solution before a test starts is dropped and cultured on an agar medium, many colonies of the *E. coli* are generated. The in-liquid plasma device 1 is operated for 5 minutes under the above-described test conditions, and the plasma treatment is performed on the test solution. During the operation, luminescence indicating plasma generation is confirmed in the tubular flow channel 10. Although culture is attempted under the same condition for 0.01 ml of the test solution after the operation, no colony generation of the *E. coli* is observed. Through the above-described tests, it is confirmed that the in-liquid plasma device 1 can sterilize the *E. coli*.

Plasma Emission Intensity Measurement

Rotational speed of the suction pump 40 is changed so as to measure intensity of light emission caused by plasma generation in the tubular flow channel 10. The test conditions are illustrated below. A result is illustrated in Expression 1.

Operating Conditions of Voltage Application Unit B
Application Voltage: ±4 kV
Pulse Width: 0.8 μs
Electrode Material: Tungsten

TABLE 1

| Flow Velocity (m/sec) | Hα Light Emission Intensity 656.3 nm | Hβ Light Emission Intensity 486.1 nm |
| --- | --- | --- |
| 9 | 403.34 | 801.11 |
| 20 | 668.03 | 787.30 |
| 28 | 6,592.11 | 1,018.65 |
| 29 | 19,696.51 | 1,574.59 |
| 35 | 40,955.96 | 2,341.17 |

As illustrated in Table 1, in accordance with an increase in the rotational speed of the suction pump 40, the intensity of light emission of the tubular flow channel 10 increases. The reason is conceivable as follows. If the rotational speed of the suction pump 40 increases, the flow velocity of the liquid increases in the tubular flow channel 10, and the amount of the bubbles generated by the cavitation increases.
Comparison with Related Art Through Simulation In order to compare the generation of the cavitation between the tubular flow channel 10 according to the present embodiment and the device in the related art (FIG. 6), simulations of the flow velocity and the pressure are performed.

Figure 7:
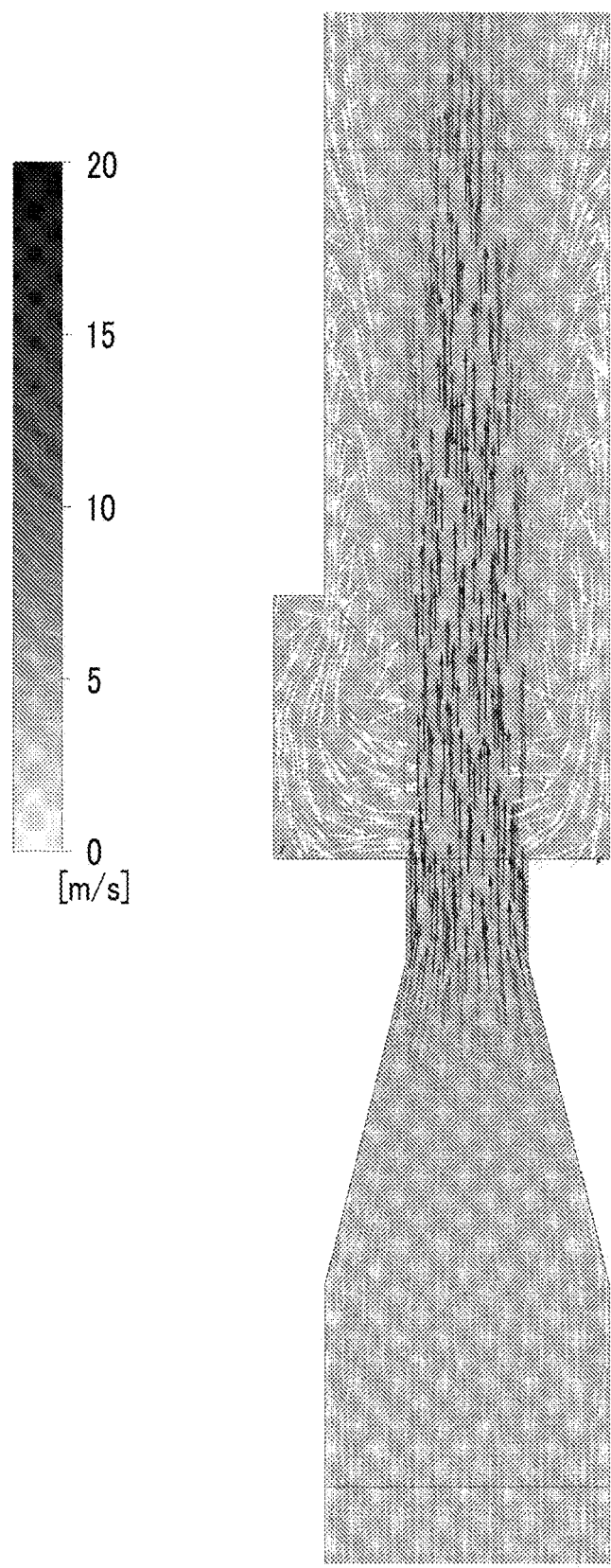
FIG. 7 illustrates a simulation result of a liquid flow in the device in the related art.
Figure 8:
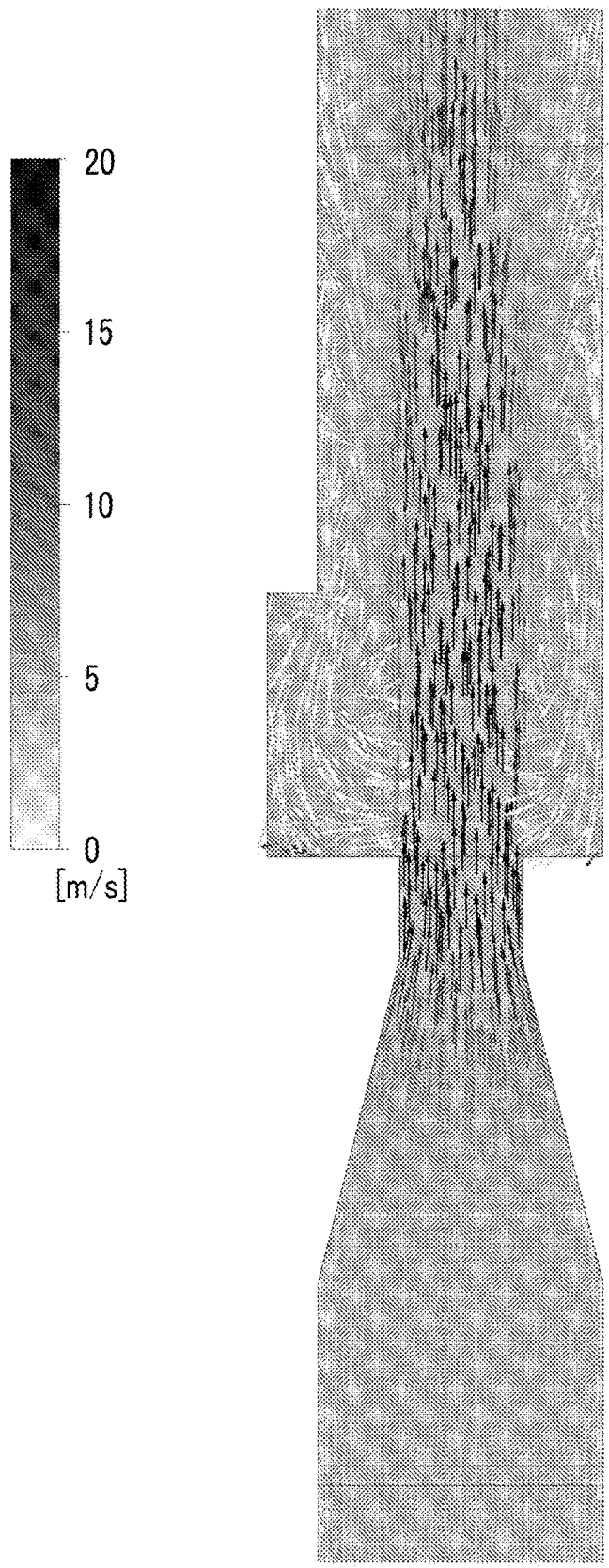
FIG. 8 illustrates a simulation result of the liquid flow in the device in the related art.
Figure 11:
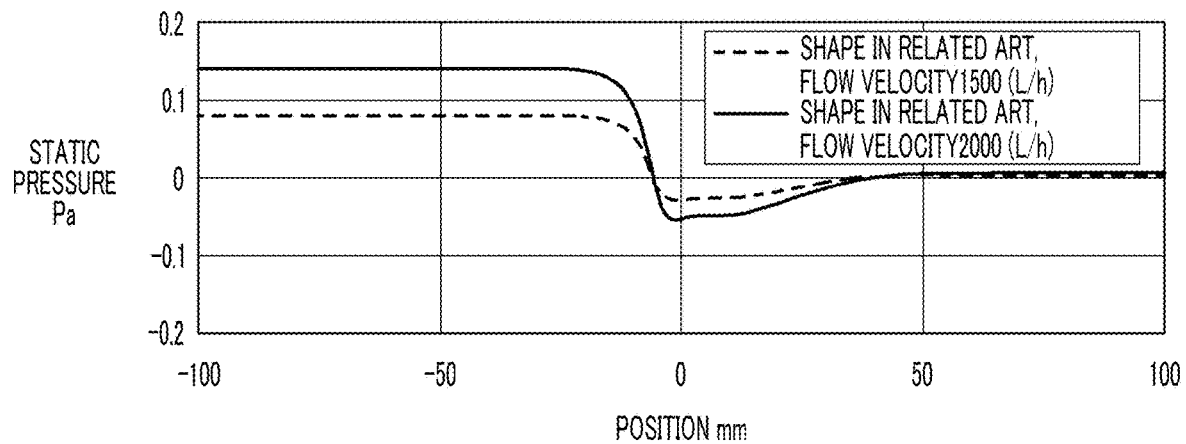
FIG. 11 illustrates a simulation result of liquid pressure in the device in the related art.

FIG. 7 illustrates a simulation result of the flow velocity at the flow velocity of 1500 L/h of the device in the related art. In a case of the liquid flowing upward from a bottom of the drawing, the flow velocity increases at a site (nozzle) whose inner diameter decreases. The flow velocity also increases in a central portion of the pipe on the downstream side of the nozzle. However, in site whose inner diameter is large on the downstream side of the nozzle, the flow velocity greatly decreases in the vicinity of an outer wall of the pipe, and a downward flow (backflow) in the drawing is generated. The same situation is also applied to FIG. 8 (device in the related art, flow velocity 2000 L/h). This result indicates that the turbulent flow or the separated flow is likely to be generated on the downstream side of the nozzle due to the shape of the device in the related art. FIG. 11 illustrates a pressure simulation result of the device in the related art. A vertical axis represents the pressure of the liquid in the central portion of the pipe. A horizontal axis represents the following. A site (end portion on the downstream side of the nozzle) whose inner diameter is smallest, which is a position in the flowing direction of the liquid, is set to 0. The upstream side is set to (−), and the downstream side is set to (+). A minimum value of the pressure is approximately −0.03 Pa at the flow velocity of 1,500 L/h, and is approximately −0.05 Pa at the flow velocity of 2,000 L/h.

Figure 9:
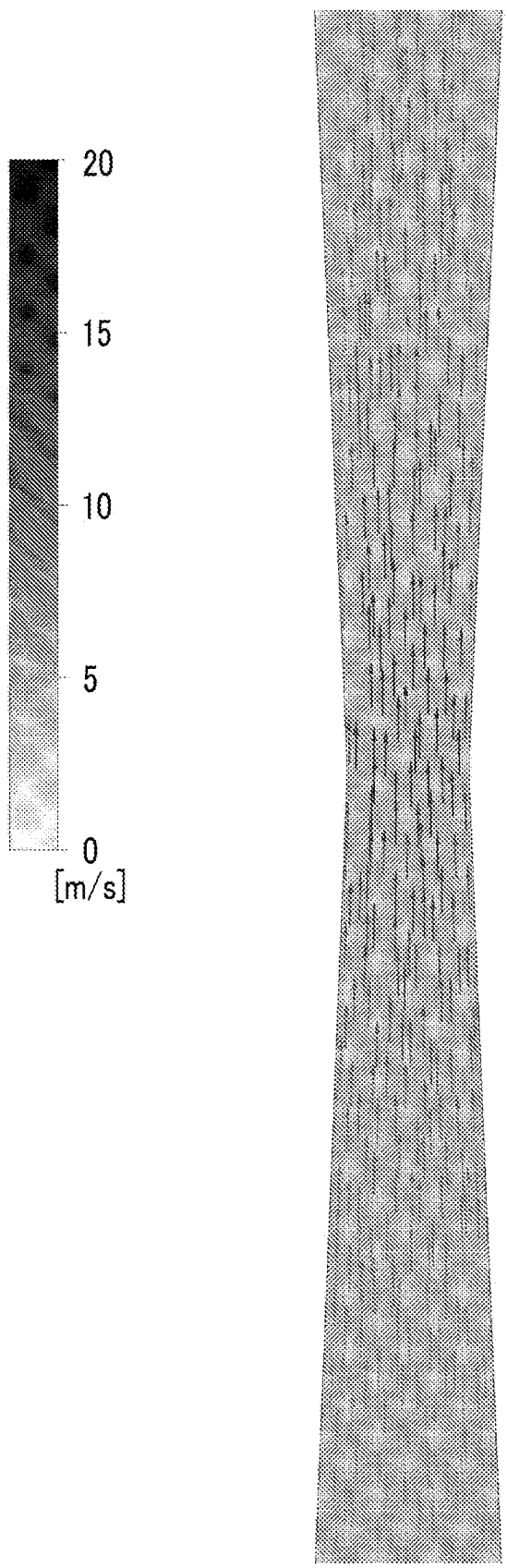
FIG. 9 illustrates a simulation result of the liquid flow in the tubular flow channel.
Figure 10:
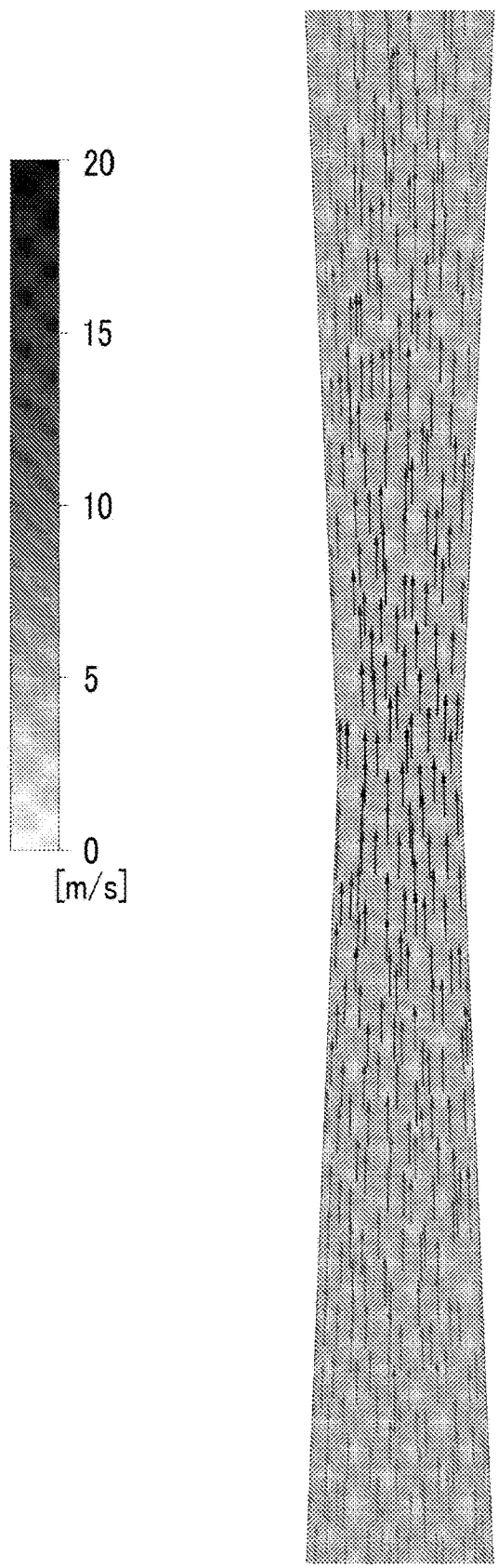
FIG. 10 illustrates a simulation result of the liquid flow in the tubular flow channel.

FIG. 9 illustrates a simulation result of the flow velocity at the flow velocity of 1500 L/h in the tubular flow channel 10 according to the present embodiment. Similarly to the device in the related art in FIGS. 7 and 8, the flow velocity of the liquid flowing upward from the bottom of the drawing increases as the liquid flows close to the narrowest site D. However, unlike the device in the related art, the flow velocity is uniform throughout the flow channel (cross-sectional direction) on the downstream side of the narrowest site D. Then, as the liquid flows close to the widest site C on the downstream side, the flow velocity gradually decreases throughout the flow channel. The backflow in the vicinity of the outer wall of the pipe or the significant decrease in the flow velocity as observed from the device in the related art does not occur in the tubular flow channel 10 according to the present embodiment. The same situation is applied to FIG. 10 (tubular flow channel 10, flow velocity 2000 L/h). This result indicates that the turbulent flow or the separated flow is less likely to be generated in the tubular flow channel 10 according to the present embodiment, unlike the device in the related art.

Figure 12:
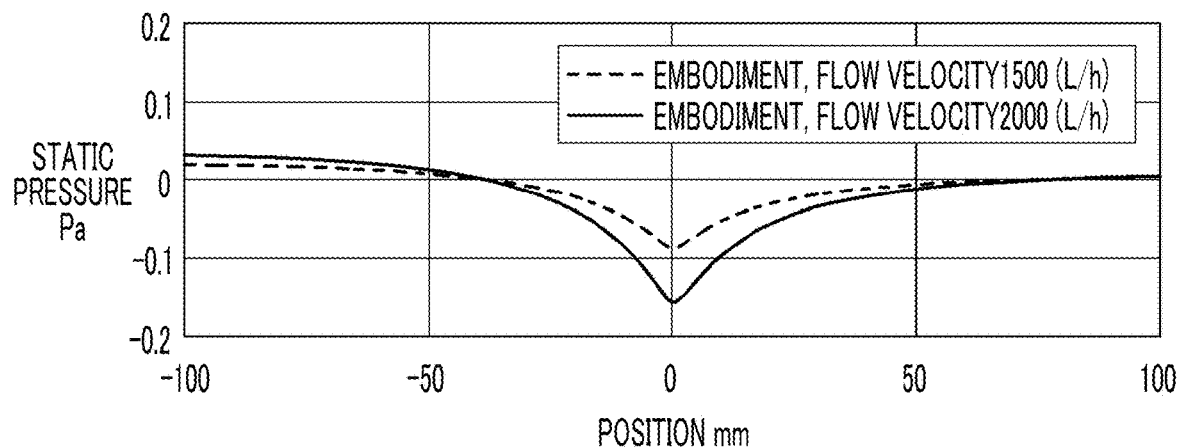
FIG. 12 illustrates a simulation result of the liquid pressure in the tubular flow channel.
Figure 13:
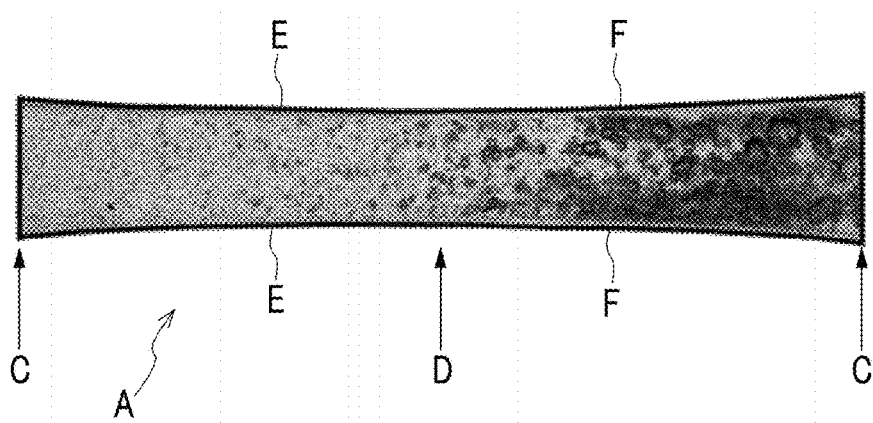
FIG. 13 is a photograph illustrating a state where cavitation is generated in a throttle portion.

FIG. 12 illustrates a pressure simulation result of the tubular flow channel 10 according to the present embodiment. The minimum value of pressure is approximately −0.09 Pa at the flow velocity of 1500 L/h, and is approximately −0.16 Pa at the flow velocity of 2,000 L/h. The pressure greatly decreases compared to the device in the related art, and the cavitation is likely to be generated. According to the device in the related art, the pressure decreases immediately in front of a position 0 mm. In contrast, in the tubular flow channel 10, the pressure gradually decreases from the vicinity of a position −20 mm, and further, a decreasing amount of the pressure is larger than that of the device in the related art. This result indicates that the cavitation can be generated in front of the narrowest site D in the tubular flow channel 10 according to the present embodiment.
Cavitation Bubble Generation Confirmation The generation of the cavitation bubbles in the cavitation generator A (throat portion) is confirmed using the above-described in-liquid plasma device 1. FIG. 13 illustrates a photograph of the cavitation generator A in a state where the water is caused to flow through the tubular flow channel 10 at the flow velocity of 3.0 m/sec or faster.

The left side in FIG. 13 is the upstream side, and the right side is the downstream side. Many bubbles (black site) are generated from the central narrowest site D to the widest site C on the downstream side. The bubbles are generated not only on the downstream side but also on the upstream side of the narrowest site D. The result indicates that the pressure actually decreases on the upstream side of the narrowest site D indicated by the above-described pressure simulation result, and that the cavitation and the plasma can be generated on the upstream side of the narrowest site D.

Another Embodiment (1) In the above-described embodiment, the in-liquid plasma device 1 is configured to have one tubular flow channel 10. The number of the tubular flow channels 10 is not limited to one, and a plurality of the tubular flow channels 10 may be arranged in parallel. In this manner, it is possible to increase the amount (treatment efficiency) of the liquid subjected to plasma treatment per unit time which is performed by the in-liquid plasma device.

(2) The number of throttle portions in the tubular flow channel 10 is not limited to four, and can be 1 to 3, 5, or more.

(3) In the above-described embodiment, the tubular flow channel 10 is formed so that the respective inner diameters of the throttle portions satisfy L1>L2>L3>L4. All of the respective inner diameters of the throttle portions can be the same as each other, or can satisfy L1<L2<L3<L4. It is also possible to adopt any desired form in which magnitude relationships are replaced with each other.

(4) In the above-described embodiment, the voltage applied to the electrode unit is controlled by the control device 35 so as to satisfy V1>V2>V3>V4. All of the applied voltages can be the same as each other, or can satisfy V1<V2<V3<V4. It is also possible to adopt any desired form in which magnitude relationships are replaced with each other.

(5) In the above-described embodiment, a configuration is adopted as follows. The circulating flow channel is formed in the in-liquid plasma device 1. The liquid passing through the tubular flow channel 10 passes through the suction pump 40, returns to the tubular flow channel 10, and passes again through the tubular flow channel 10. As a modification example, a configuration may be adopted as follows. The liquid subjected to the plasma treatment after passing through the tubular flow channel 10 is discharged from the in-liquid plasma device 1 without any change. The in-liquid plasma device 1 having a so-called one-pass type in this way is preferably applied, for example, to a case where the plasma treatment is performed on a large amount of the liquid stored inside the tank (for example, ballast water of a tanker). In this case, the strength of the plasma or the length of the tubular flow channel 10 is properly adjusted depending on a required degree of the plasma treatment (such as sterilizing power or a dispersion degree of the powder).

(6) The plasma emission performance can be greatly improved by combining the above-described in-liquid plasma device 1 with a centrifugal type pump mechanism (jet paster) which can generate the cavitation in the outlet. Specifically, the tubular flow channel 10 including the voltage application unit B is located in the outlet of the centrifugal type pump mechanism (jet paster). In this manner, the plasma emission performance can be greatly improved in the tubular flow channel 10.

The configurations disclosed in the above-described embodiments (including the other embodiments, the same shall apply hereinafter) are applicable in combination with the configurations disclosed in the other embodiments, as long as no contradiction arises. The embodiments disclosed herein are merely examples. Without being limited thereto, the embodiments of the present invention can be appropriately modified within the scope not departing the concept of the present invention.

It should be understood that the invention is not limited to the above-described embodiment, but may be modified into various forms on the basis of the spirit of the invention. Additionally, the modifications are included in the scope of the invention.

What is claimed is:

1. An in-liquid plasma device comprising:
a tubular flow channel in which a liquid flows; and
a cavitation generator and a voltage application unit which are disposed in the tubular flow channel,
wherein the cavitation generator generates cavitation in the liquid inside the tubular flow channel,
wherein the voltage application unit is located in the tubular flow channel so as to generate plasma by applying a voltage to the liquid in which the cavitation is generated,
wherein the cavitation generator is configured to have a throttle portion whose inner diameter is smaller than other sites in the tubular flow channel,
wherein the throttle portion is configured to have:
an upstream side inclined surface which is an inclined surface located on an upstream side of a narrowest site of the throttle portion, and
a downstream side inclined surface which is an inclined surface located on a downstream side of the narrowest site of the throttle portion, and
wherein a shape of the downstream side inclined surface is expressed by a sine function which consists of a cross-sectional area and an inner diameter of the narrowest site of the throttle portion, a cross-sectional area and an inner diameter of a broadest site in the tubular flow channel, and a distance between the narrowest site and the broadest site.

2. The in-liquid plasma device according to claim 1, wherein the upstream side inclined surface and the downstream side inclined surface have a symmetrical shape with respect to the narrowest site.

3. The in-liquid plasma device according to claim 1, wherein the downstream side inclined surface has the shape expressed by the sine function such that a flow of the liquid is not separated from an inner wall of the tubular flow channel.

4. The in-liquid plasma device according to claim 1, wherein a plurality of the tubular flow channels are arranged in parallel.

5. The in-liquid plasma device according to claim 1, further comprising:
a centrifugal type suction pump,
wherein the liquid flowing out of the tubular flow channel is supplied to the suction pump, and the liquid discharged from the suction pump is supplied to the tubular flow channel.

6. The in-liquid plasma device according to claim 1, wherein the sine function is represented by the following equation:

$$y(x) = \frac{l_2\left(\frac{S_1}{S_2}-1\right)}{4}\sin\left(\frac{4}{nl_2}x-\frac{\pi}{2}\right)+\frac{l_2\left(\frac{S_1}{S_2}+1\right)}{4}$$

where, y(x) is a function representing the shape of the downstream side inclined surface,
n is a value of 2(l3/l2),
S1 is the cross-sectional area of the broadest site in the tubular flow channel,
S2 is the cross-sectional area of the narrowest site of the throttle portion,
l2 is the inner diameter of the narrowest site of the throttle portion, and
l3 is the distance between the narrowest site and the broadest site.

7. An in-liquid plasma device comprising:
a tubular flow channel in which a liquid flows; and
a cavitation generator and a voltage application unit which are disposed in the tubular flow channel;
wherein the cavitation generator generates cavitation in the liquid inside the tubular channel;
wherein the voltage application unit is located in the tubular flow channel so as to generate plasma by applying a voltage to the liquid in which the cavitation is generated;
wherein the cavitation generator is configured to have a throttle portion whose inner diameter is smaller than other sites in the tubular flow channel;
wherein the throttle portion is configured to have:
an upstream side inclined surface which is an inclined surface located on an upstream side of a narrowest site of the throttle portion, and a downstream side inclined surface which is an inclined surface located on a downstream side of the narrowest site of the throttle portion; and wherein the cavitation generator has at least two throttle portions adjacent to each other in series, and the voltage applied to the liquid by the voltage application unit in an upstream throttle portion located on an upstream side is higher than the voltage applied to the liquid by the voltage application unit in a downstream throttle portion located on a downstream side of the upstream throttle portion.

8. An in-liquid plasma device comprising:

a tubular flow channel in which a liquid flows; and a cavitation generator and a voltage application unit which are disposed in the tubular flow channel;

wherein the cavitation generator generates cavitation in the liquid inside the tubular flow channel;

wherein the voltage application unit is located in the tubular flow channel so as to generate plasma by applying a voltage to the liquid in which the cavitation is generated;

wherein the cavitation generator is configured to have a throttle portion whose inner diameter is smaller than other sites in the tubular flow channel;

wherein the throttle portion is configured to have:

an upstream side inclined surface which is an inclined surface located on an upstream side of a narrowest site of the throttle portion, and a downstream side inclined surface which is an inclined surface located on a downstream side of the narrowest site of the throttle portion; and wherein the cavitation generator has at least two throttle portions adjacent to each other in series, and the inner diameter of an upstream throttle portion located on an upstream side is larger than the inner diameter of a downstream throttle portion located on a downstream side of the upstream throttle portion.

* * * * *